Figure 1:
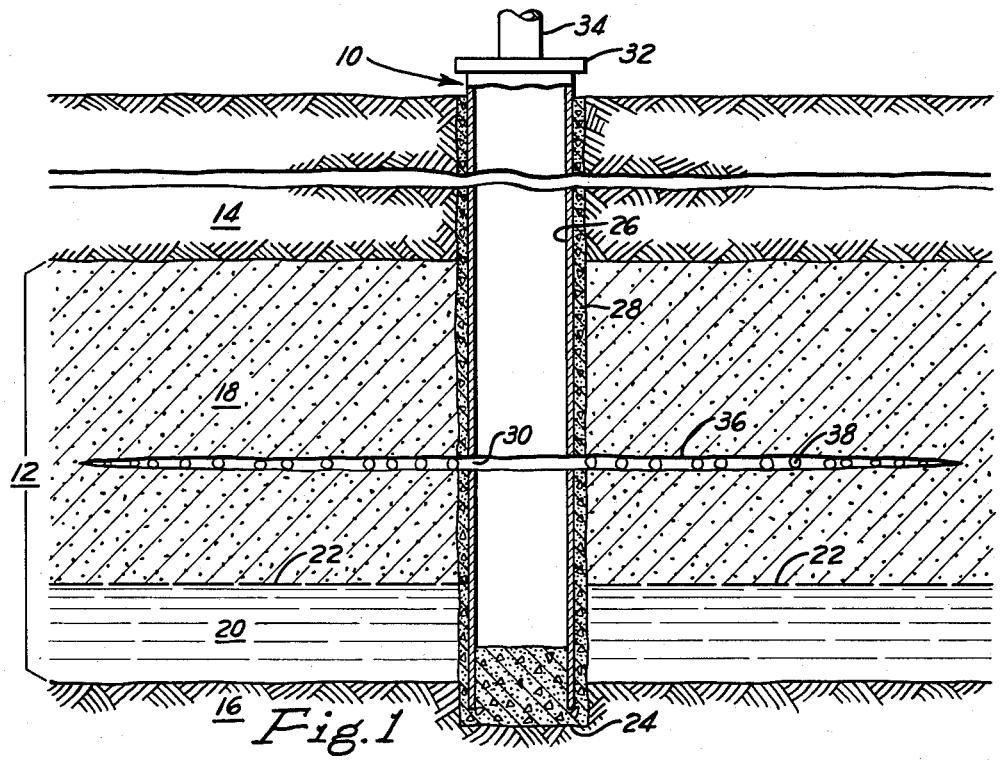

INVENTORS.
JIMMIE L. HUITT
EDWARD TOPANELIAN, JR.

ATTORNEY

United States Patent Office 3,245,468
Patented Apr. 12, 1966

3,245,468
METHOD FOR CREATING A BARRIER AROUND A WELL
Jimmie L. Huitt, Shaler Township, Allegheny County, Pa., and Edward Topanelian, Jr., Port Charlotte, Fla., assignors to Gulf Research & Development Company, Pittsburgh, Pa., a corporation of Delaware
Filed Nov. 6, 1962, Ser. No. 235,741
3 Claims. (Cl. 166—21)

This invention relates to the production of oil and more particularly to the creation of a barrier extending from a well into a surrounding subsurface formation to control the pattern of flow of fluids through the formation around the well.

Frequently conditions existing in a subsurface oil-bearing formation make it desirable to create a substantially impermeable barrier extending outwardly from a well. For example, in some oil fields, during the production of oil, water underlying the oil in the pay zone cones upwardly around the well and enters the well through perforations in the oil zone of the pay formation. The creation of a thin substantially horizontal impermeable barrier extending outwardly from the well below the perforations in the oil zone will block the flow of water and prevent its entrance into the well. Similarly, gas coning sometimes can be prevented by creating a substantially impermeable horizontal barried extending radially around the well below the gas cap but above the perforations through which the oil flows into the well.

To be effective in preventing coning of water or gas, the barrier frequently must extend for a substantial distance into the formation. The desired radius of the barrier for the prevention of coning will depend upon well spacing, production rate, permeability of the formation, and the density and viscosity of the oil. Barriers having a radius as large as 100 feet are in some instances necessary to allow production of oil from the well at the desired rate without production of excessive water or gas.

One technique that has been used to prevent the flow of unwanted fluids into a well is squeeze cementing. In that technique a sealing material, usually a slurry of Portland cement, is displaced under a high pressure through perforations into the formation to isolate the oil-producing zone from zones producing other fluids. Although squeeze cementing is effective in correcting poor primary cementing of the well, it has not been an effective method of counteracting gas or water coning. In the usual squeeze cementing operation, the cement usually penetrates the formation for only a short distance over a substantial vertical extent, but does not form a barrier extending a substantial distance into the formation.

Another method that has been suggested for creating barriers of substantial radial extent is to displace a suitable sealing material, ordinarily a slurry of Portland cement, into an exposed portion of the formation under a pressure adequate to fracture the formation. The well is then shut in for a period long enough to allow the cement to set to form the desired impermeable barrier. Completely filling a fracture with a Portland cement slurry is difficult if the fracture is of any substantial size. Liquid from the cement slurry is lost into the large exposed area of both faces of the fracture, which causes substantial dewatering of the cement slurry with the result that cement solids bridge the fracture and prevent flow of cement slurry into the outer reaches of the fracture. Laboratory tests, under conditions which can be carefully controlled and which allow accurate observation of the flow of cement slurries, indicate bridging may occur before the cement slurry flows as much as five feet into a fracture if the cement slurry is squeezed into the fracture under high pressure.

This invention resides in a method of creating an impermeable barrier extending from a well into a surrounding subsurface formation by creating a fracture extending the desired distance radially from the well, placing propping agents in the fracture to hold the fracture open, and thereafter displacing a slurry of cement into the fracture under a low pressure just adequate to overcome the pressure of fluids in the formation to fill the fracture with the cement slurry, after which the cement is allowed to set to form a desired barrier.

Figure 2:
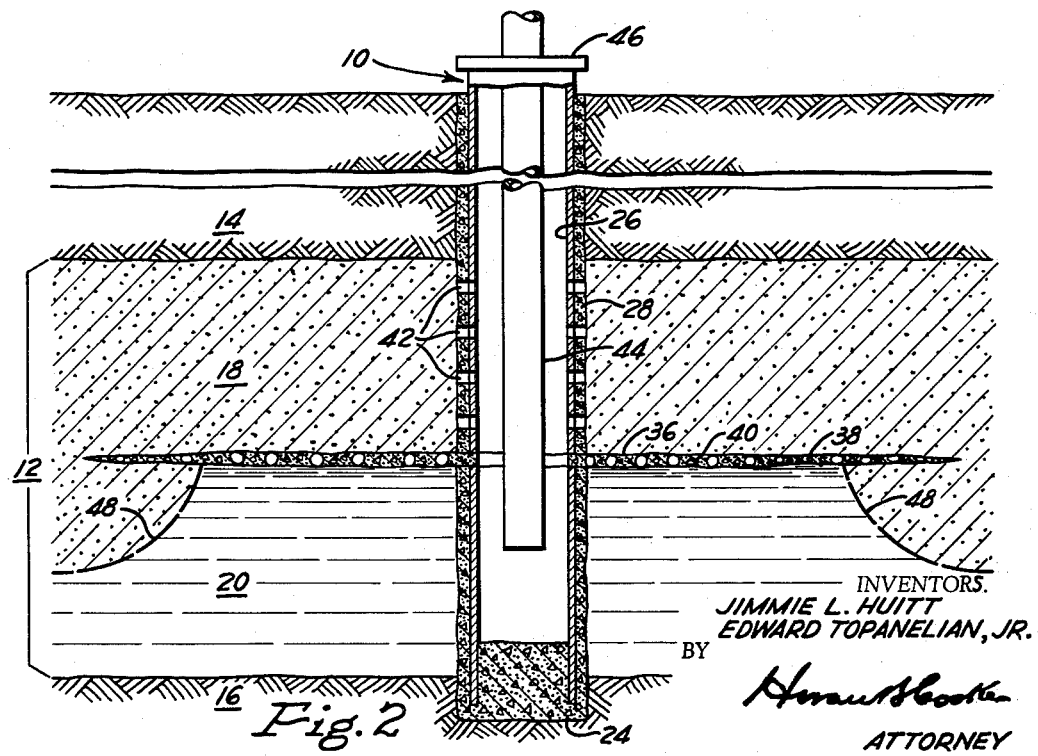

In the drawings:
FIGURE 1 is a diagrammatic view partially in vertical section of a well at an intermediate step in the creation of a barrier adapted to prevent water coning; and
FIGURE 2 is also a diagrammatic view partially in vertical section of the well illustrated in FIGURE 1 having a barrier constructed in accordance with this invention and completed for the production of oil.

Referring to the drawings, a well, indicated generally by reference numeral 10, is drilled through a subsurface pay zone 12 lying between a cap rock 14 and base rock 16. Pay zone 12 consists of an oil zone 18 overlying a water zone 20. The normal oil-water contact is indicated by the broken line 22.

The well 10 is drilled into base rock 16 to a total depth 24, and casing 26 is run into the well to a level below the lower boundary of pay zone 12. Casing 26 is cemented in place by conventional cementing techniques to form a sheath 28 of cement surrounding the casing and preventing vertical flow between the outer surface of the casing and the borehole wall.

After casing 26 has been cemented in place, a horizontal notch 30 is cut in the casing at the level of the desired barrier which should be in the oil zone 18 above the level of oil-water contact 22. Notch 30 can be cut by conventional casing cutting means such as a rotary milling tool or by a shaped explosive charge. It is preferred that the oil zone 18 be undercut at the level of notch 30 to expose horizontal surfaces, thereby facilitating the creation of a horizontal fracture extending from the notch. Undercutting a formation to allow the subsequent creation of a fracture extending from the undercut is described and claimed in Patent No. 2,699,212 of N. B. Dismukes.

Following the cutting of the notch 30, a cap 32 having an opening therein to receive an inlet line 34 is secured to the upper end of the casing. A fracturing fluid supplied from a suitable source by high pressure pumping equipment, not shown is displaced through inlet line 34 into the casing and outwardly through the notch 30 into the formation. The pressure on the fracturing fluid is increased until a break in the pressure indicates that the formation has been fractured. Additional fracturing fluid is then displaced into the resultant fracture 36 at a high rate to extend the fracture the desired radial distance from the well.

In a preferred process for the creation of the fracture 36, the liquid initially displaced down the well and through the notch 30 is an aqueous or petroleum based liquid having characteristics such that the liquid readily penetrates the formation 18. That "high-penetrating" liquid is followed by a "low-penetrating" liquid which may have a substantially higher viscosity than the initial high-penetrating liquid, and preferably has materials suspended in it adapted to form a seal on the faces of the fracture and diminish loss of fluid from the fracture into the formation. A wide variety of additives for addition to fracturing liquids to reduce loss of liquid into the formation is available commercially. An additive for reducing the fluid loss of an oil-base fracturing liquid is described in U.S. Patent No. 2,779,735.

A liquid having a propping agent suspended in it is displaced into fracture 36 at a rate and in a volume calculated to place propping agent, indicated by reference numeral 38, throughout the full radial extent of the desired barrier, and the pressure on the well is then decreased to a pressure which allows the overburden to settle on the propping agent and hold it in place. The propping agent used will depend upon the characteristics of the pay zone 12 and the overburden pressure applied to the propping agent when pressure on the well is reduced. If the well is deep thereby causing the overburden pressure to be high and the pay zone is a hard formation, a hard deformable propping agent such as granular walnut shells is preferred. If the fracture is at shallower depths at which the overburden pressure is not as great, sand can be used as the propping agent. Sand is a preferred propping agent because of its low cost and compatibility with cement when it is capable of supporting the overburden to hold the fracture open. It is preferred that the concentration of the propping agent in the suspending liquid used to carry the propping agent into the fracture is such that a partial monolayer of particles of propping agent is placed in the fracture to provide a fracture of maximum permeability.

After the fracture has been formed and the propping agent 38 placed therein, the pressure on the well is reduced to a pressure causing the pressure at notch 30 to be just slightly above the fluid pressure in the pay zone, and a cement slurry is displaced down the well and into fracture 36. An advantage of this invention lies in the ability to displace the cement slurry under very low pressures into the fracture because the fracture is held open by propping agent 38, whereby liquids are lost very slowly from the slurry and it is possible to completely fill the fracture with the cementing material. For this reason, it is desirable that the pressure on the cement slurry in the well at the level of fracture 36 be only slightly, for example not more than 100 p.s.i. higher than the pressure in the pay zone 12. A pressure sufficient to cause the cement to flow into the fracture at a rate of approximately two barrels per minute or less is preferred, but higher rates may be necessary to fill large fractures in deep formations before the cement sets. In any event, the borehole pressure at the level of the fracture should not be more than 150 p.s.i. higher than the formation pressure. After the amount of cement slurry calculated to fill the fracture 36 for the radial distance of the desired barrier has been displaced into the fracture, pressure is maintained on the well until the cement sets. Upon setting, cement fills the fracture 36 to form the desired barrier, indicated generally in FIGURE 2 by reference numeral 40, adapted to prevent coning.

For simplicity the creation of the barrier has been described in a fracturing and cementing operation in which the liquids for fracturing the cement are pumped down the well in the casing. In many instances it is not desirable to subject the casing to the pressure required for fracturing, in which event tubing is run down the casing to the desired level through a packer set above the pay formation in accordance with conventional procedures.

Well 10 is completed for the production of oil by drilling any plug of cement or other material which remains in the well above the level of the barrier. In the embodiment of the invention illustrated in FIGURE 2, the plug of cement is drilled to a point below the barrier but above the lower end of the casing. Thereafter, the casing 30 and surrounding cement sheath are perforated, as indicated by reference numeral 42, above the level of the barrier. Tubing 44 is run into the well to the desired depth through a suitable closure 46 on the upper end of casing 26. Oil from the pay zone 12 flows through perforations 42 into the lower end of tubing 44. If necessary a pump may be installed within the tubing for the lifting of oil to the surface. During the production of oil, water tending to cone upwardly toward the perforations 42, as is indicated in FIGURE 2 by broken line 48, is stoppped by the barrier 40.

In a specific embodiment of this invention, it is desirable to produce oil from a pay zone 40 feet thick at a depth of 4,210 to 4,250 feet penetrated by a well drilled and cased through the entire pay zone. Well surveys indicate that the normal oil-water contact is at a depth of 4,240 feet and the formation pressure is 1,940 p.s.i. A notch is cut in the casing and surrounding formation by means of an explosive charge at a depth of 4,230 feet. After the casing is cut, tubing open on the lower end and containing perforations one foot from the lower end is lowered into the well such that the lower end of the tubing is about five feet below the notch. With the annulus open at the surface, sand of 20–40 mesh U.S. Sieve Series size in water is circulated down the tubing and the sand is deposited in the wellbore to fill the wellbore to a point about five feet below the notch. The tubing is then raised such that the lower end of the tubing is about two feet above the notch. One barrel of 5 percent by weight hydrochloric acid is displaced down the tubing and when the acid reaches the bottom of the tubing the annulus is closed at the surface to force the acid through the notch. The acid is followed by a fracturing liquid consisting of water containing guar gum in an amount adapted to reduce the penetration of the water into the formation and increase the viscosity of the fracturing liquid to 190 seconds by the Marsh Funnel Test. The fracturing liquid is pumped down the well at a rate of 5 barrels per minute until the pressure declines sharply, indicating the formation has fractured, after which the rate is increased to 15 barrels per minute until a total of 25 barrels of fracturing liquid have been displaced from the well into the fracture. The fracturing liquid is followed by a similar liquid containing approximately 0.15 pound of 6 to 8 mesh, U.S. Sieve Series rounded walnut shells, per gallon of liquid and the rate of pumping continued at 15 barrels per minute until a volume of 30 barresl of the walnut shell suspension has been pumped. This is followed by pumping a sufficient volume of water at a rate of 15 barrels per minute to displace the walnut shell suspension into the fracture.

After the suspension of propping agent has been displaced into the fracture, the well is shut in to permit the overburden to come to rest on the propping agent and the liquid to revert to a low viscosity fluid. The tubing is then lowered to position the lower end of the tubing at the level of the notch. A plug that is easily destroyed by drilling and can be moved through the tubing under a differential pressure of 50 p.s.i. is then inserted in the tubing. The annulus is opened sufficiently at the surface to permit the displacement of fluid from the annulus by displacement of the plug down the tubing. The plug is displaced down the tubing with 15.5 pounds per gallon Portland cement slurry containing an additive to reduce fluid loss and a retarder giving a setting time of four hours. After 1.5 barrels of cement are displaced into the tubing a second plug is inserted. The insertion of a plug and subsequent displacement with 1.5 barrels of cement are repeated until 6 barrels of the cement slurry have been displaced into the tubing. Another plug is then placed in the tubing and displaced with water. A sufficient volume of water is pumped down the tubing to displace the first inserted plug to a point where cement exits from the tubing by way of the perforations in the tubing. The annulus is then closed at the surface and the cement slurry is displaced from the tubing and into the propped fracture at a rate of 1.5 barrels per minute and at a pressure in the wellbore adjacent the notch averaging approximately 75 p.s.i. above the formation pressure. The tubing is then raised five feet and a volume of water equivalent to the volume of the tubing is circulated down the annulus and up the tubing. The well is then shut in until the cement sets. The tubing is removed from the well and the drillable plugs, cement, and sand are drilled. The well is then perforated at an interval of 4215 to 4235 feet and placed on production.

If the fracture were not held open by the propping agent the pressure at the fracture during the cementing operation would have to exceed 4200 p.s.i. to hold the fracture open sufficiently for displacement of the cement into the fracture, in which case the cement slurry would be subjected to a differential pressure of 1800 p.s.i. resulting in excessive fluid loss and likely dehydration of the cement, preventing the cement from being properly placed in the fracture. However, with the fracture propped and the cement displaced by the method described herein, the cement is displaced at a pressure exceeding the formation pressure by no more than 150 p.s.i. in which case the filtration of the cement is unlikely to result in dehydration.

This invention has been described for the creation of a horizontal barrier for prevention of coning of water into oil wells. It can also be used for the creation of a barrier to prevent coning of gas into oil wells by locating the barrier above the perforations through which oil flows into the well. The invention is particularly useful for the creation of barriers for the prevention of short circuiting of driving fluids in a secondary recovery process utilizing a single well. In such a process, a horizontal barrier would be created between injection and production perforations. It is also useful for the creation of vertical barriers. While the invention has been described for the creation of a barrier of Portland cement it can be used advantageously for the creation of a barrier from any solidifiable material delivered into a fracture as a fluid and having a tendency to flow into a permeable formation.

We claim:

1. A method of creating a substantially horizontal barrier for the prevention of coning into wells extending from a well into an underground formation penetrated by the well comprising creating a substantially horizontal fracture extending from the well into the underground formation, displacing into the fracture a liquid having a propping agent suspended therein, reducing the pressure in the well at the level of the fracture whereby the faces of the fracture engage the propping agent and hold the propping agent in the fracture, displacing a slurry of cement into the fracture at a borehole pressure at the level of the fracture less than 150 p.s.i. higher than the formation pressure, and maintaining on the well at the level of the fracture a pressure less then 150 p.s.i. higher than the formation pressure and adapted to hold the cement slurry in the fracture until the cement sets.

2. A method of creating a substantially horizontal barrier for the prevention of coning into wells extending from a well into an underground formation penetrated by the well comprising creating a substantially horizontal fracture extending from the well into the underground formation, displacing into said fracture a liquid containing a fluid-loss additive adapted to seal the faces of the fracture, displacing a liquid containing a propping agent into the fracture, reducing the pressure in the fracture whereby the faces of the fracture engage the propping agent and hold the propping agent in the fracture, displacing a slurry of cement into the fracture at a borehole pressure at the level of the fracture less than 150 p.s.i. higher than the formation pressure, and maintaining in the well at the level of the fracture a pressure less than 150 p.s.i. higher than the formation pressure and adapted to hold the cement in the fracture until the cement sets to form a barrier.

3. A method of creating a substantially horizontal barrier for the prevention of coning into wells extending from a well into an underground formation penetrated by the well comprising creating a substantially horizontal fracture extending from the well into the formation, displacing into the fracture a liquid containing a fluid-loss additive adapted to form a seal on the faces of the fracture, displacing into the fracture a liquid containing a propping agent in a concentration adapted to deposit a partial monolayer of propping agent in the fracture, reducing the pressure in the borehole of the well at the level of the fracture higher than the formation pressure but less than 150 p.s.i. higher than the formation pressure to maintain the seal on the faces of the fracture, displacing a cement slurry at a rate less than two barrels per minute into the fracture at a pressure in the fracture less than 150 p.s.i. higher than the formation pressure, and maintaining the pressure in the well at the level of the fracture at a pressure less than 150 p.s.i. higher than the formation pressure and adapted to hold the cement in the fracture until the cement sets.

References Cited by the Examiner

UNITED STATES PATENTS

| 2,163,449 | 6/1939 | Owsley et al. | 166—42.1 X |
| 2,368,424 | 1/1945 | Reistle. | |
| 2,782,857 | 2/1957 | Clark et al. | |
| 3,004,600 | 10/1961 | Henderson et al. | 166—42.1 X |
| 3,121,464 | 2/1964 | Huitt et al. | 166—42.1 |

OTHER REFERENCES

Gatlin, C.: Petroleum Engineering, Englewood Cliffs, N.J., 1960, Pg. 280.

CHARLES E. O'CONNELL, *Primary Examiner.*

BENJAMIN HERSH, *Examiner.*